Nov. 7, 1950  G. C. FERGUSON  2,529,007
TRACTOR RIDGE LEVELER
Filed Dec. 24, 1946

Inventor:
GENE C. FERGUSON,

By McMorrow, Berman & Davidson
ATTORNEYS.

Patented Nov. 7, 1950

2,529,007

UNITED STATES PATENT OFFICE 2,529,007

TRACTOR RIDGE LEVELER

Gene C. Ferguson, Oskaloosa, Iowa

Application December 24, 1946, Serial No. 718,205

1 Claim. (Cl. 37—181)

This invention relates to an attachment for light farm tractors of the type used for the cultivation of growing plants, such as corn, cotton and the like, and in particular, to plows, shovels or plates suspended in front of the wheels for leveling the ground in front of the tractor to prevent bouncing and the like.

This type of modern tractor is usually equipped with one or two steering wheels supported on an axle mounted to turn about a vertical axis for steering purposes and to guide the tractor between the adjacent rows of plants. These steering wheels are usually equipped with pneumatic tires which are very efficient when operated over comparatively smooth and even surfaces. However, when traveling over newly plowed or freshly worked ground, the forward end of the tractor bounces upward and downward making riding thereon uncomfortable.

With these ends in view, this invention contemplates a small, comparatively light weight frame with a guiding wheel and soil-leveling elements on the outer end thereof, wherein the frame is adapted to be attached to the forward end of a tractor and the elevation of the elements thereon adjusted by instrumentalities on the tractor.

The purpose of this invention is, therefore, to provide means of simple construction that may be easily and quickly attached to the forward end of a tractor which may be guided therewith for leveling the ground surface ahead of each of the steering wheels as the tractor is advanced, to form comparatively smooth paths for said wheels to travel over and thus eliminate the undesirable bouncing effect.

More specifically, it is the object of this invention to provide a detachable bracket which may be secured to the forward end of a tractor and arranged to support a forwardly extending frame pivotally mounted, so that the forward end of the frame is free to be elevated and lowered, and to provide on the forward end of said frame one or more earth-leveling tools positioned to cut off or level the high points of the earth's surface immediately ahead of the steering wheel or wheels, and in connection therewith means for elevating and holding the leveling tool out of operative relation with the ground surface, and, furthermore, a device which is mounted so as not to interfere with the guiding of the tractor when turning at the end of the field.

Another object of the invention is to provide a guiding wheel on the forward end of a frame for supporting earth-leveling elements to prevent the elements running in furrows and ditches.

A further object of the invention is to provide in an earth-leveling attachment for tractors and the like means limiting the downward movement of the leveling elements.

A still further object of the invention is to provide a simple, unique earth-leveling attachment for tractors and the like which is of a simple and economical construction.

With these and other objects in view, the invention includes a frame in the form of a strut or boom with a wheel in the outer end, earth-leveling elements resiliently mounted on the sides thereof, means pivotally mounting the inner end of the frame on the forward end of a tractor, a chain suspending the frame to limit the downward movement thereof, and suitable instrumentalities for adjusting the elevation of the frame and leveling elements thereon.

Other features and advantages of the invention will appear from the following description taken in connection with the drawings, wherein.

Figure 1:
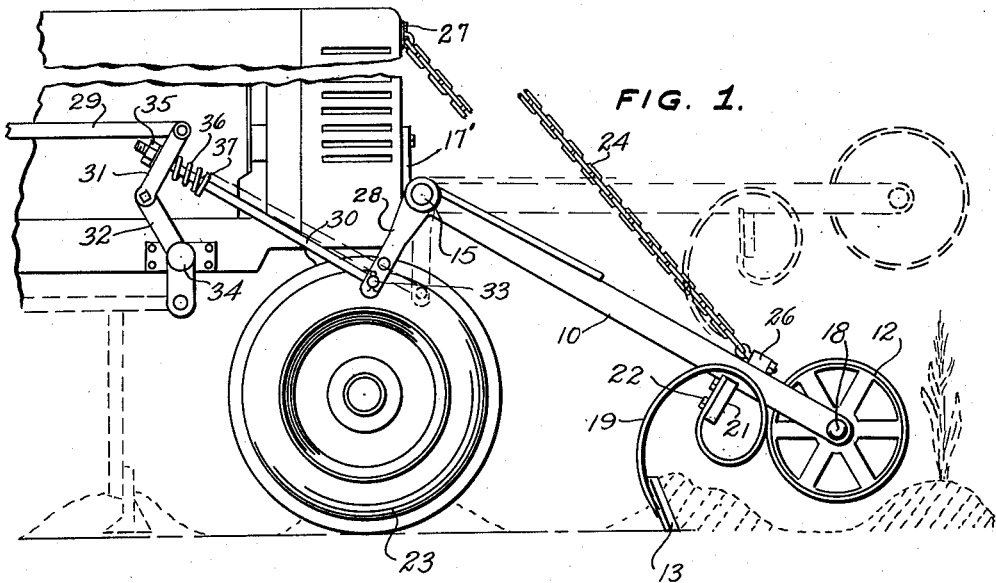
Figure 1 is a view showing a side elevation of the earth-leveling attachment illustrating the application thereof to the forward end of a tractor and with the main portion of the tractor and other parts thereof broken away.
Figure 2:
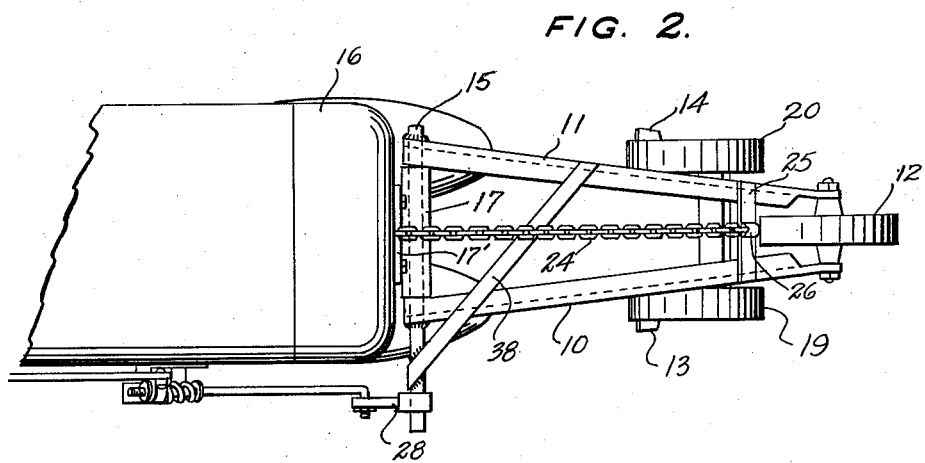
Figure 2 is a plan view of the earth-leveling device illustrating the use thereof on the forward end of a tractor.

Referring now to the drawings, wherein like reference characters indicate corresponding parts, the earth-leveling device of this invention includes a frame having side elements 10 and 11 with a wheel 12 rotatably mounted in the outer end and plates forming plows or shovels, as indicated by the numerals 13 and 14.

The frame is fixedly mounted on a shaft 15, and the shaft is pivotally attached to the forward end of a tractor 16 by means of a bearing 17 carried by a bracket 17' which is attached to the front of a tractor.

The wheel 12 is rotatably mounted in the outer end of the frame on a shaft 18, and the shovels 13 and 14 are mounted on springs 19 and 20, and the upper ends of the springs are fixedly attached to a cross-member 21 of the frame by bolts 22. With the elements in these relative positions, the shovels 13 and 14 are located between the wheel 12 and the front wheel 23 of the tractor, and the shovels may be in the positions illustrated, or may be moved backward so that they are relatively close to the front wheel of the tractor, as may be desired.

A chain 24 is also attached to a cross-member 25 at the forward end of the frame by a socket 26, and the upper end of the chain is attached to the front of the tractor by a bolt or clevis 27, as shown in Figure 1.

The frame is elevated to upward or downward position by an arm 28 on the outer end of the shaft 15, and the arm is connected to an operating lever 29 through a rod 30 and levers 31 and 32, as shown in Figure 1. The arm 28 is provided with a plurality of openings 33 through which the rod 30 is attached thereto, which provides means for adjusting the leverage to increase or decrease the upward and downward movement of the outer end of the frame. The lever 32 is pivotally mounted on the side of the tractor by a bracket 34, and the upper end of the rod 30 is attached to the lever 31 by an adjusting nut 35 which holds the rod against a spring 36, the lower end of the spring resting upon a collar 37 on the rod. The frame formed of the side members 10 and 11 may be provided with a diagonal brace 38 and other supporting elements may be incorporated therein as may be desired.

It will be understood that other modifications may be made in the design and arrangement of the elements of the attachment without departing from the spirit of the invention.

The tractor ridge-leveling attachment of this invention is comparatively small and made of relatively light structural elements, wherein it may readily be mounted in the shop or field on the forward end of a tractor by a single person, and which adds very little weight to the forward end of the tractor. In operation, the attachment is suspended from the forward end of a tractor, as illustrated in Figure 1, and as the tractor moves along the rows of corn, cotton or the like, the shovels, positioned in front of the wheels, remove obstacles and level off uneven surfaces of the soil so that comparatively smooth, even tracks are provided in front of the wheels. The wheel 12 is positioned slightly above the lower edges of the shovels so that in crossing ditches, furrows and the like, the elements cannot drop downward. These wheels also provide means for riding the shovels over rocks, boulders and the like to prevent breaking thereof.

What is claimed is:

In a tractor ridge leveler comprising a frame hinged at the rear end thereof to the forward end of a tractor, a front wheel rotatably mounted at the front central portion of the frame, a pair of spiral springs secured upon the latter intermediate the front wheel and the front wheels of the tractor, and means limiting the downward movement of the frame for operation, the features which include a horizontal transverse bearing fixed upon the forward end of the tractor, a transverse shaft extending rotatably through the bearing and together therewith forming the hinge connection between the frame and the tractor, the shaft being rigidly fixed to the rear end of said frame, a depending arm rigidly fixed upon one end of the shaft, a brace fixed upon the shaft intermediate said bearing and the depending arm and overlying the frame and secured thereto intermediate the forward and rear ends thereof, a link pivotally connected at the forward end thereof to the lower end of said arms, and manually operated levers connected to the rear end of said link for raising and lowering said frame.

GENE C. FERGUSON.

REFERENCES CITED

The following references are of record in the file of this patent:

UNITED STATES PATENTS

| Number | Name | Date |
| --- | --- | --- |
| 1,728,032 | Bising | Sept. 10, 1929 |
| 1,964,617 | Bird | June 26, 1934 |
| 2,160,524 | Sutherland | May 30, 1939 |
| 2,171,830 | Hayes | Sept. 5, 1939 |
| 2,179,793 | Lewison | Nov. 14, 1939 |
| 2,277,880 | Noble | Mar. 31, 1942 |